(12) United States Patent
Farrag

(10) Patent No.: US 8,528,852 B2
(45) Date of Patent: Sep. 10, 2013

(54) FLIGHT UNIT THAT CAN BE COUPLED TO A ROAD VEHICLE HAVING SINGLE-FILE SEATING

(76) Inventor: Rainer Farrag, Wolfurt (AT)

(*) Notice: Subject to any disclaimer, the term of this patent is extended or adjusted under 35 U.S.C. 154(b) by 308 days.

(21) Appl. No.: 12/955,137

(22) Filed: Nov. 29, 2010

(65) Prior Publication Data

US 2011/0163197 A1 Jul. 7, 2011

(30) Foreign Application Priority Data

Nov. 27, 2009 (DE) .......................... 10 2009 056 137

(51) Int. Cl.
*B64C 37/02* (2006.01)
(52) U.S. Cl.
USPC ................................ 244/2; 244/50; 244/120
(58) Field of Classification Search
USPC ............................................................ 244/2
See application file for complete search history.

(56) References Cited

U.S. PATENT DOCUMENTS

| 2,241,577 | A | * | 5/1941 | Beals, Jr. | 244/49 |
| 2,430,869 | A | * | 11/1947 | Fulton, Jr. | 244/2 |
| D155,569 | S | * | 10/1949 | Bailey | D12/4 |
| 2,593,785 | A | | 4/1952 | Nye et al. | |
| 2,619,301 | A | * | 11/1952 | Hall | 244/2 |
| 2,624,530 | A | * | 1/1953 | Hanssen | 244/2 |
| 2,767,939 | A | * | 10/1956 | Taylor | 244/2 |
| 2,770,427 | A | * | 11/1956 | Schreffler | 244/2 |
| 3,645,474 | A | * | 2/1972 | Arbuse | 244/2 |
| 4,269,374 | A | * | 5/1981 | Miller | 244/2 |
| 4,358,072 | A | * | 11/1982 | Williamson | 244/2 |
| 5,050,817 | A | * | 9/1991 | Miller | 244/2 |
| 5,782,427 | A | * | 7/1998 | Hermach | 244/2 |
| 7,938,358 | B2 | * | 5/2011 | Dietrich et al. | 244/2 |
| 2003/0094536 | A1 | * | 5/2003 | LaBiche | 244/2 |

FOREIGN PATENT DOCUMENTS

| DE | 760791 A | 2/1953 |
| DE | 2438526 A1 | 2/1976 |
| EP | 0097622 A1 | 1/1984 |
| FR | 994341 A | 11/1951 |
| FR | 1265234 A | 5/1961 |
| GB | 559819 A1 | 3/1944 |
| GB | 2455362 A | 6/2009 |
| JP | 2004082748 A | 3/2004 |

OTHER PUBLICATIONS

European Search Report of EP Appln. No. 10 01 4683 dated Nov. 7, 2012.

* cited by examiner

*Primary Examiner* — Christopher P Ellis
*Assistant Examiner* — Medhat Badawi
(74) *Attorney, Agent, or Firm* — Browdy and Neimark, PLLC

(57) ABSTRACT

A vehicle suitable as both a road vehicle and an aircraft, which includes two units that can be coupled to one another; a first unit embodies a road vehicle with least single-file seating, and a second unit is embodied as a flight unit.

14 Claims, 11 Drawing Sheets

FLIGHT UNIT THAT CAN BE COUPLED TO A ROAD VEHICLE HAVING SINGLE-FILE SEATING

FIELD

The subject of the invention is a flight unit that can be coupled to a road vehicle that has single-file seating, and particularly a vehicle, suitable as both a road vehicle and an aircraft.

BACKGROUND

Flight units with single-file seating that can be converted from a road vehicle have become known for instance with the subject of German Patent Disclosure DE 2357628 A1. There, a wing is attached in telescoping fashion to a motor wheel on both sides and is intended in conjunction with a tail assembly to create a flight unit.

The wings can be extended in telescoping fashion, to achieve the requisite lift capability of the flight unit created from them.

However, providing wings that can be extended in telescoping fashion on a road vehicle is practically possible to accomplish, because during flight they lack the requisite lift, and the longitudinal guidance and locking of the individual telescoping parts is so difficult that a functioning flight unit cannot be created from them.

Another disadvantage is that there is no coupling between the flight unit and a road vehicle, since the road vehicle can only be converted as a flight unit but cannot be coupled with it.

Attaching all the flying parts to the road vehicle of DE 2357628 A1, however, has the disadvantage that on the road, the road vehicle is difficult to maneuver and inconvenient to drive, and moreover it has a considerable weight, which makes use on the road difficult.

Moreover, neither the road vehicle nor the road vehicle that can be converted into a flight unit is protected by a cabin, so the driver sits entirely out in the open, both while driving and during flight. Hence accidents pose a considerable risk.

Nor does the aforementioned reference provide any technical teaching for how a flight drive mechanism should look, since in that road vehicle a flight mechanism is entirely lacking.

It must therefore be assumed that such a vehicle is not capable of flight, especially since the indications for how the individual flight control elements are disposed are lacking.

With the subject of German Patent Disclosure DE 101 59 082 A1, a vehicle with side-by-side seating has become known, which is also supposed to create a flight unit, which can be flown, out of a land vehicle with side-by-side seating.

A disadvantage of this arrangement, however, is again that the land vehicle can be converted into a flight unit only by attaching parts and redesigning them; that is, the land vehicle carries all the necessary parts for flight with it, and no coupling between the land vehicle and the flight unit is provided.

This is due to the fact that the same drive motor is used for both the road vehicle and the push propeller, and as a consequence, very little power is available for flying.

According to air traffic control regulations, it is furthermore questionable whether a drive motor designed for on-road operation can be used simultaneously as a flight motor, since for use as a flight motor, stringent demands for quality must be met, relatively brief maintenance intervals must be adhered to, and high-quality tests and overhauls are necessary, which are not necessary for a motor of a road vehicle.

With the subject of German Patent DE 197 49 647 C2, a motorized road vehicle with side-by-side seating, in the form of a bus or car, is disclosed, but a road vehicle with single-file seating in accordance with FIGS. 8 and 9 can also be provided, on which the wing and skid mechanisms are disposed in hinged fashion. Here again, there is the disadvantage that the road vehicle has to carry all the parts necessary for flight (wings, flight motor, horizontal stabilizer, rudder unit, and all the other control instruments) with it during on-road operation, which leads to an inadequate mode of operation during on-road operation.

The same criticism also applies to German Patent Disclosure DE 102 21 301 A1, which again discloses a road vehicle that is equipped with fold-up flying parts.

SUMMARY

It is therefore the object of the invention to create a flight unit which can be coupled with a road vehicle, is embodied as a lightweight aircraft, and is especially easy to drive in road traffic and has a correspondingly low weight.

For attaining this stated object, the invention provides a vehicle, suitable as both a road vehicle and an aircraft, comprising two units that can be coupled to one another, in which a first unit is embodied as a road vehicle with at least single-file seating, and a second unit is embodied as a flight unit.

An essential characteristic of the invention is that according to the invention, a road vehicle with single-file seating can be coupled to a flight unit, and the road vehicle and the flight unit are each assigned their own drive motors.

With the technical teaching provided, the essential advantage is attained that because of the coupling of a road vehicle with a flight unit, the possibility now exists for the first time of operating the road vehicle by itself on the road, without having to carry the parts necessary for flight along with it. As a result, an especially lightweight and also easily maneuvered road vehicle is created.

It is especially preferred if the road vehicle is embodied with single-file seating; that is, it is embodied on the order of a light motorcycle, moped, or motorcycle.

The result is the substantial advantage that it is especially easy to maneuver on the road, and it is also easy to park in parking spaces because of its very short length. In a refinement of the present invention, it is provided that this road vehicle, which is embodied with single-file seating, has a cockpit which encloses and surrounds the upper part of the road vehicle as much as possible all the way around.

Thus the advantage is that two persons can drive in a road vehicle with single-file seating that is fully enclosed and protected against the weather.

These two persons (driver and passenger) then sit on their own seats with a backrest and are belted in, which otherwise is intrinsically impossible in road vehicles with single-file seating.

In such a road vehicle with single-file seating, there is the necessity in on-road operation that the vehicle also be braced while stopped; otherwise, it would tip over.

Since the cockpit preferably surrounds the lower part of the road vehicle as well, a way must be created for protecting the road vehicle against tipping over if it drops below a certain minimum speed.

For that purpose, the invention provides that an opening is made in the floor of the cockpit, through which the driver has the capability of putting his leg out at the bottom and using it as a support leg on the road.

However, once the road vehicle has reached a higher speed, for instance more 10 kilometers per hour, this opening should if at all possible be closed.

For that purpose, the invention provides a closure flap, disposed in the floor of the cockpit and displaceable in the longitudinal direction of the road vehicle, which automatically opens at a speed of less than 10 km/h, for instance, and automatically closes at a speed of more than 10 km/h.

To make it possible in an emergency stop that the closure flap will abruptly open, it is provided that it is kept in the closed position under spring loading, and if an emergency stop ensues or a sudden drop in speed occurs, the spring coupling is disconnected, and the closure flap is abruptly moved to the open position.

Accordingly, it is important in the invention that there be a closure flap that opens an opening in the floor of the cockpit, which closure flap is kept in the closed position in spring-loaded fashion, and which under spring load can be abruptly moved to the open position.

This movement to the open position can occur under the influence of sensors or other tripping mechanisms.

The aforementioned characteristics of a road vehicle, including the embodiment of the cockpit and the other characteristics of the road vehicle, which can also be actuated independently of the flight mode, are claimed as independent claims.

For the present invention, it is still optional whether the road vehicle with single-file seating has front-wheel or rear-wheel drive provided by the drive motor assigned to the road vehicle. It is understood to be preferable to use a rear-wheel drive of the kind used with motorcycles or light motorcycles; for a better ride on the road, a rocker for the rear wheel is provided, which is sprung and provided with a shock absorber, to make travel in the vehicle as pleasant as possible.

The front wheel, in a manner known per se, is embodied as braced via shock absorbers, sprung, and steerable.

According to the invention, it is provided that the cockpit is covered over its full surface as much as possible and is accordingly also closed at the bottom; in accordance with the above description, at the bottom there is only a closure flap, and otherwise the bottom of the road vehicle is closed.

To enable passengers to board and disembark, it is provided that the cockpit has one or more boarding doors, and these doors can be opened and closed in an arbitrary way.

A pivot axis can be provided which is oriented parallel to the longitudinal axis of the road vehicle, so that the entire upper part of the cockpit can be hinged open at the side, making the interior of the road vehicle accessible.

It is also possible, in the manner of gullwing doors, to attach two doors on the left and right of the cockpit that are pivotable upward each about a respective horizontal pivot axis.

There are also many possibilities for making the interior of the cockpit accessible so that passengers can board and disembark.

In the present invention, the embodiment of the flight unit is also claimed as its own subject of an invention. Various possibilities exist for the embodiment of the flight unit. In a first embodiment of the invention, the flight unit can have a push propeller, which is driven by its flight drive mechanism. This flight drive mechanism can be either a piston-type internal combustion engine, a rotary piston engine, or a jet turbine.

All kinds of hybrid drives can also be employed.

In the coupling between the road vehicle and the flight unit, it is important that the coupling be effected especially simply and securely. For that purpose, it is provided that the flight unit, on its front, free end, has a coupling apparatus which is suitable for being solidly coupled and connected to certain parts of the road vehicle.

The details of this coupling apparatus will be addressed in the special part of the description.

In another embodiment of the invention, it can be provided that the flight unit, which is embodied as a gyroplane; that is, it has a rotor blade which is not driven and that rotates only as a result of the relative wind and the propulsion. Here as well there is an airscrew, which is embodied as a push propeller and is assigned its own flight drive mechanism.

In a third embodiment, it can be provided that the flight unit is embodied as a helicopter, which has a driven rotor in combination with a likewise driven tail rotor.

It is an advantage of the invention that it is now possible for a road vehicle that is very well suited to on-road driving, because it is lightweight and easily maneuverable, to be coupled to an arbitrary flight unit. There is the advantage that the road vehicle is not limited to being coupled with only one type of flight unit; instead, the road vehicle can be coupled with various types of flight units. These types have been described above.

Thus the road vehicle need not carry any parts necessary for flight along with it, and the parts necessary for the flying mode are all integrated with the flight unit, including the control stick and the throttle, which after the flight unit is coupled to the road vehicle are integrated with the road vehicle in such a way that the driver of the road vehicle can now easily operate these control elements.

Flight instruments necessary for the flying mode are disposed in the road vehicle and are coupled to the flight unit via an electrical connection device as soon as the flight unit has been joined to the road vehicle. In this way, all the flight data are displayed on a suitable monitor in the road vehicle and can be operated via certain control elements.

Because the road vehicle is fully enclosed, there is no requirement for passengers to wear helmets, because they are protected in the cockpit.

There is also the advantage that now, with a road vehicle, one can drive to an arbitrary airfield, and at the airfield, one can rent a flight unit that is kept on hand there and can be coupled to the road vehicle.

In this way, a universally usable road vehicle that is suitable for use by the driver at all times is proposed that can be arbitrarily coupled with various flight units.

This kind of combination flight unit that comprises both a road vehicle and a flight unit is also highly suitable for military purposes, because with this very lightweight flight unit, it is possible to land at remote locations; the flight part is then uncoupled, and vehicle operation can continue using the easily maneuvered road vehicle.

The road vehicle can also be equipped with weapons.

The subject of the present invention is the result not only of the subject of the individual claims but also of the combination of the various claims with one another.

BRIEF DESCRIPTION OF THE DRAWINGS

All the indications and characteristics disclosed in these documents, including the abstract, and in particular the three-dimensional version shown in the drawings, are claimed as essential to the invention, to the extent that they are individually or in combination novel over the prior art.

The invention will be described in further detail below in conjunction with drawings, which show merely one possible embodiment. From the drawings and their description, further characteristics essential to the invention and advantages of the invention will become apparent.

Figure 1A:
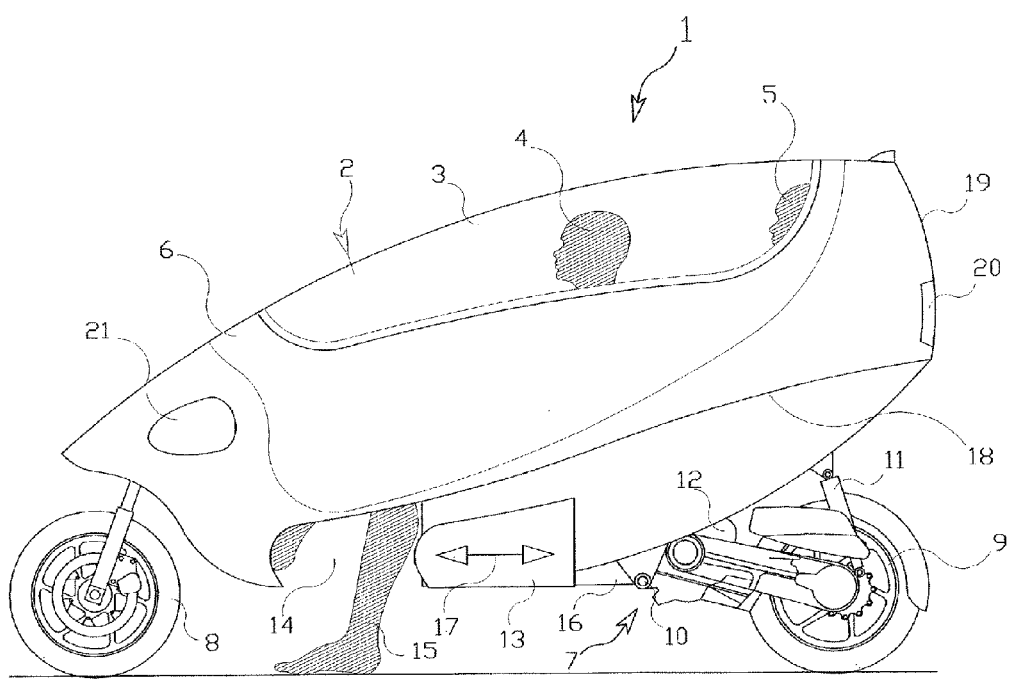
Figure 1B:
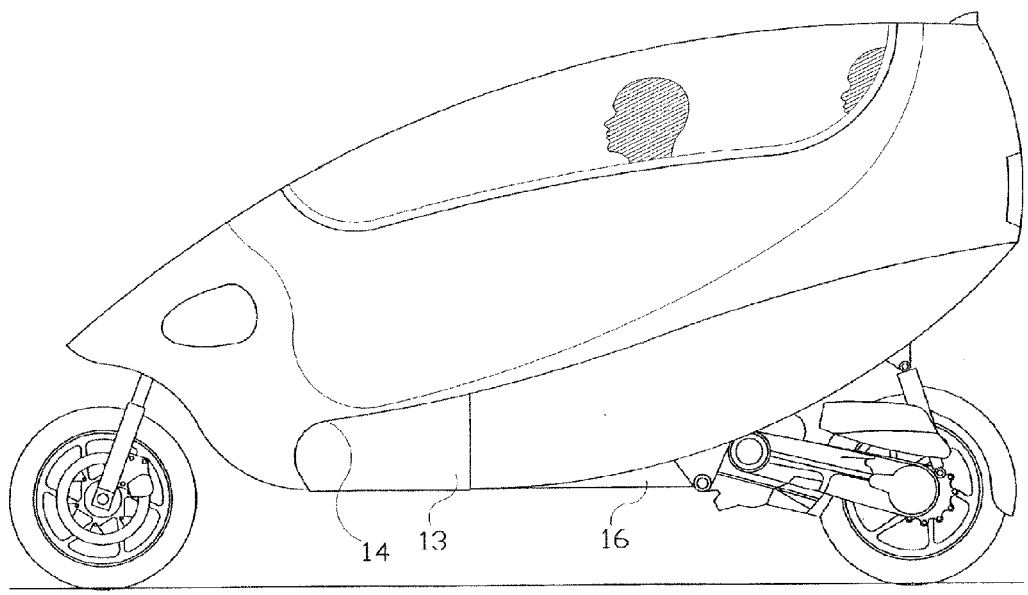
Figure 2A:
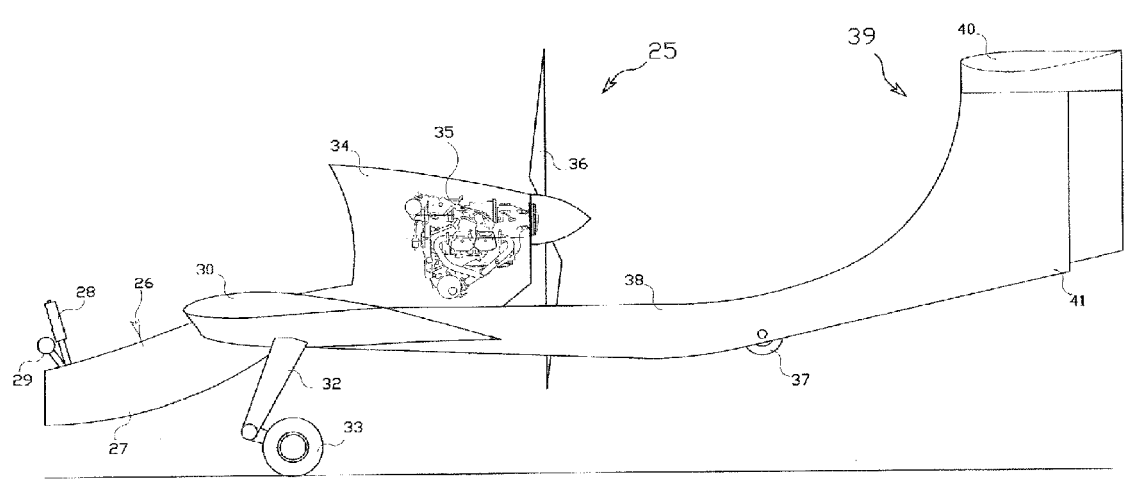
Figure 2B:
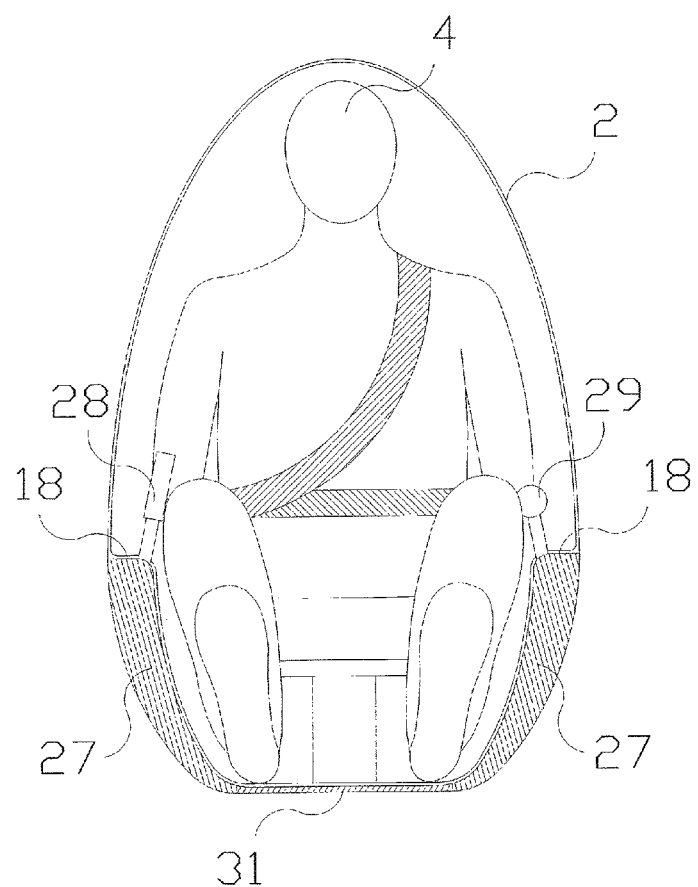
Figure 2C:
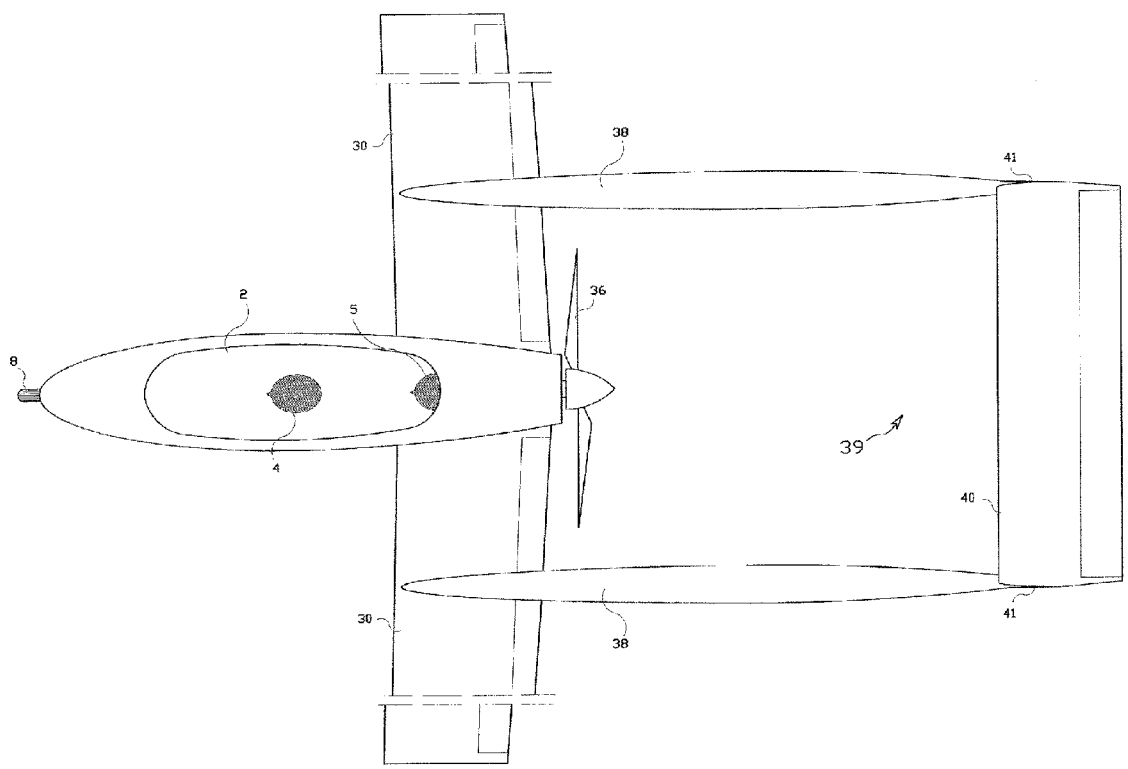

Shown are:

FIG. 1A: schematically, the side view of a road vehicle according to the invention, with the closure flap at the bottom in the open position;

FIG. 1B: the road vehicle of FIG. 1 with the opening flap in the closed position;

FIG. 2A: the flight unit associated with the road vehicle;

FIG. 2B: the road vehicle in the state in which it is coupled to the flight unit;

FIG. 2C: the top view on the flight unit that is coupled to a road vehicle.

Figure 3A:
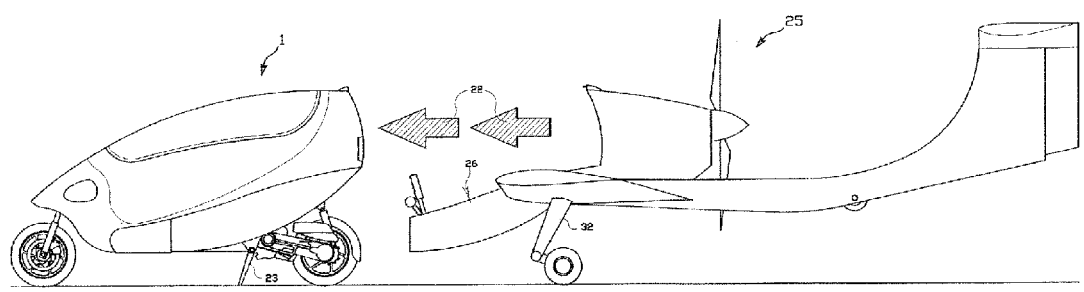
Figure 3B:
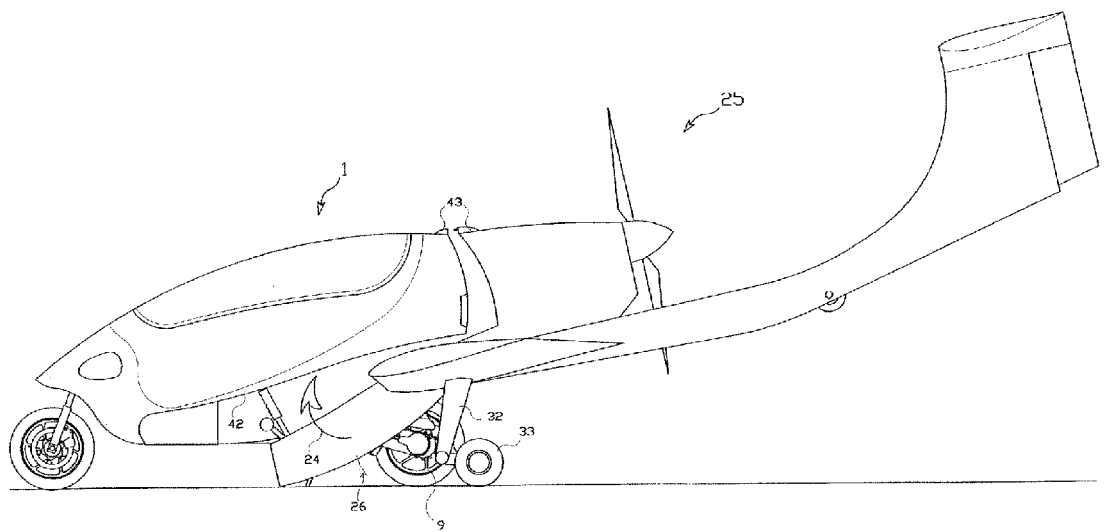
Figure 3C:
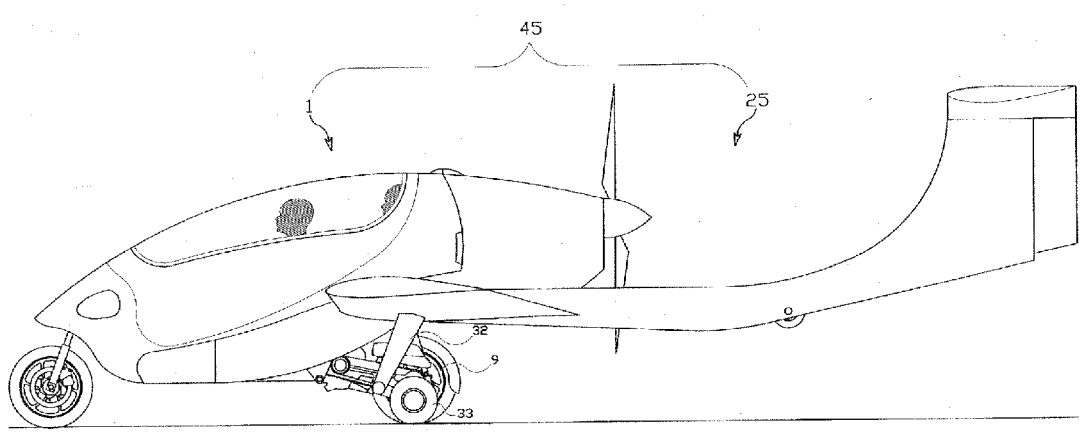
Figure 4:
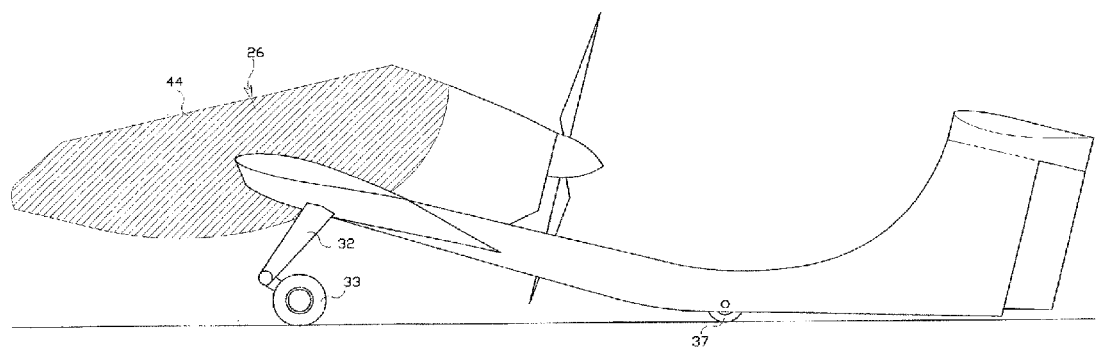
Figure 5:
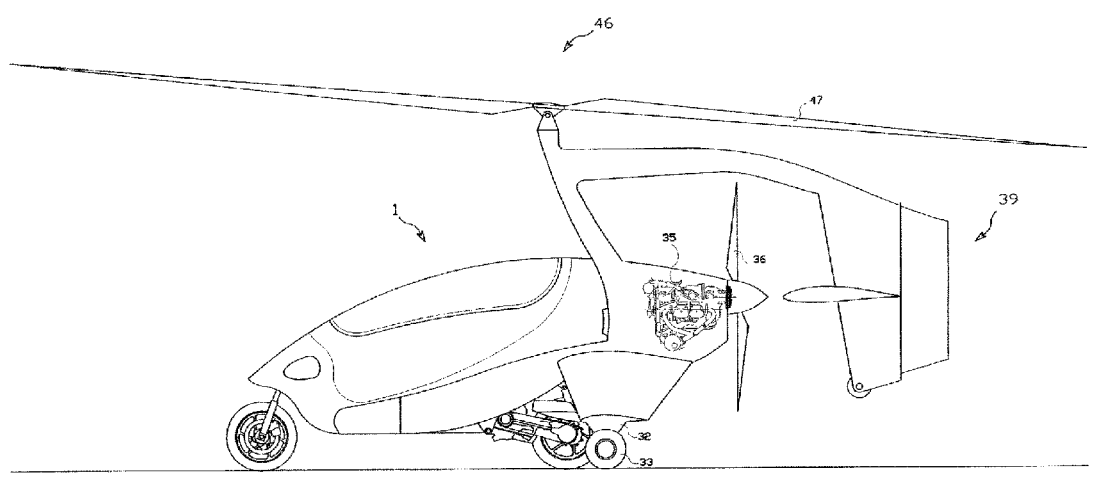

FIG. 3A: the procedure for coupling the road vehicle and the flight unit;

FIG. 3B: the further progress of the procedure of coupling the two elements of FIG. 3A;

FIG. 3C: the completely coupled lightweight aircraft, which comprises the road vehicle and the flight unit;

FIG. 4: the illustration showing that the flight unit can be coupled with a tarp and parked at arbitrary locations;

FIG. 5: a second embodiment of a capable apparatus embodied as a gyroplane; and

Figure 6:
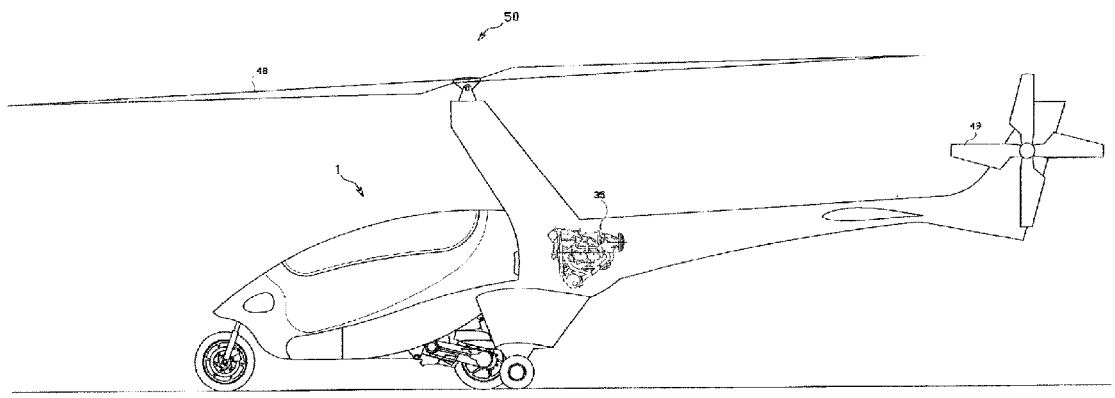

FIG. 6: a third embodiment of a flying apparatus, embodied as a helicopter.

DETAILED DESCRIPTION

The invention is a vehicle with single-file seating and with a largely closed cabin, which can be driven even in bad weather.

FIG. 1A: A vehicle with single-file seating, with a cabin for a driver and a passenger. The cabin is provided with two side openings in the lower front.

The bottom is open in the front region so that the driver can brace the vehicle with his legs in a standing position.

The driver and passenger sit one behind the other, belted in, on seats with backrests in the cabin (helmets are not required to be worn). Thus the vehicle can even carry children (in child seats). The instruments required for road traffic are installed in the vehicle. It is also possible to retrofit the vehicle with flight instruments, so that after being coupled to a flight unit, it is also suitable for flying.

FIG. 2A: A flight unit (without a passenger cabin), comprising two load-bearing surfaces, flight drive mechanism, two rudder units, and one horizontal stabilizer.

The horizontal stabilizer, in the rear region, connects the two rudder units, which are joined to the load-bearing surfaces by means of two connecting spars.

A landing gear is installed under both load-bearing surfaces for landing and ground maneuvers; an airscrew is installed on the engine, if necessary. Two lateral docking spars connect the load-bearing surfaces with the drive compartment and also contain all the flight control levers.

FIG. 3A: The vehicle is set erect on a stand, and the floor in the front region of the vehicle is closed with a closure plate. The flight unit is pushed behind the vehicle.

FIG. 3B: The aircraft is pushed farther to the front, and the flight control levers are adapted through the two side openings in the vehicle with single-file seating inside the cabin.

FIG. 3C: The flight unit is joined to the vehicle by the two docking sides, and the parking stand on the vehicle is folded up out of the way. The docking sides cover the side openings on the vehicle and ensure that the flight unit and the vehicle are solidly joined to one another.

FIG. 4: After being uncoupled from the vehicle at the airport, the flight unit can be covered with a tarp and parked, while the vehicle is used for trips on the road.

FIG. 5: The vehicle with single-file seating can also be coupled to a gyrocopter (without a cabin), as shown in FIGS. 1 through 4.

FIG. 6: A vehicle with single-file seating, with coupling to a helicopter (without a cabin), coupled as in FIGS. 1A through 5.

In FIG. 1A, a road vehicle 1, which is embodied with single-file seating, is shown in general.

The single-file embodiment of the road vehicle in fact has the advantage that an especially lightweight road vehicle is created, which is accordingly suitable for being coupled to a lightweight flight unit, so that it can be operated in the ultralight class under EU regulations. An EU regulation of this kind provides at the present time that a takeoff weight of 472 kg must not be exceeded, and this requirement is met by the embodiment of the road vehicle as a vehicle with single-file seating and an especially lightweight flight unit 25. In the United States, the Sport Pilot category and Light Sport Aircraft rules apply.

By meeting this requirement, the further advantage is specifically obtained that a flight unit of this kind is very easy to fly, that all that is needed for operating the road vehicle is a motorcycle or passenger car driver's license, and that operating it as a flying apparatus does not require a more difficult skill test of the kind otherwise needed for sport aircraft.

The road vehicle 1 essentially has a cockpit 2, and there is a door 6 with cladding that can be opened and closed in any arbitrary position. The pivot axes and door drives for the door 6 that are required for opening and closing the door are not shown in further detail.

In the interior of the cockpit 2, there is in any case room for the driver 4 and a passenger 5 sitting behind the driver.

In the interior of the cockpit 2, there is in any case room for the driver 4 and for a passenger 5 seated behind him.

The cockpit 2 is mounted on a landing gear 7 of a vehicle with single-file seating that is preferably embodied as a light motorcycle or as a motorcycle. In a manner known per se, this landing gear 7 has a front wheel 8, which is steerable and is sprung via a front wheel rocker, and in the rear it has a rear wheel 9, which is driven via a motor 12 and has a rear wheel rocker 10 with a shock absorber 11.

In the embodiment of the road vehicle 1 as a vehicle with single-file seating, it is important that the driver 4 has the possibility of stabilizing the road vehicle on the road, if the speed drops below a certain minimum speed. It is true that support wheels could be provided, but such support wheels are difficult to actuate, and they increase the weight of the vehicle, which is not favorable for all operating states, since in inclined positions of the road vehicle 1, it might not be possible to deploy the support wheel on the inclined side.

For that purpose, the invention provides that at least one closure flap 13 is disposed on the bottom of the cockpit 2; it is kept in the closed position in spring-loaded fashion, and it is embodied as displaceable in the direction of the longitudinal axis of the vehicle, in the directions of the arrows 17.

This closure flap 13 is guided displaceably on a rail 16; the displacement drive takes place for instance via a cable and a spring.

Hence the actuation of the closure flap 13, in the position shown in FIG. 1A, uncovers an opening 14 on the underside of the cockpit 2, through which opening the driver 4 can put his leg 15 down onto the road, to protect the road vehicle 1 against tipping over.

As soon as a certain speed is exceeded, the closure flap 13 is put into the closed position by the motor or the cable, as indicated in FIG. 1B. The closure flap 13' then closes the opening 14.

However, as soon as the road vehicle 1 drops below a certain minimum speed, or an emergency stop ensues, a sensor trips the closure flap 13, which is thus moved abruptly into the open position under the load of a spring. In this way, the driver 4 always has the capability of putting his leg on the roadway in good time to protect the road vehicle 1 from tipping over.

It is understood that the description that the driver 4 puts his leg 15 on the road to protect the road vehicle from tipping over should be understood as only an example.

In another embodiment, it may be provided that instead of the leg 15 of the driver 4, an electromagnetic bracing foot, a telescoping foot, or some other mechanical bracing element is placed on the road surface, to protect the road vehicle 1 from tipping over.

FIG. 2A now shows the flight unit 25, which in the exemplary embodiment shown is embodied as a push propeller, since it has an air screw 36, which generates an airflow oriented rearward, with the air screw 36 driven by a flight drive mechanism 35.

In the exemplary embodiment shown, the flight drive mechanism 35 is embodied as a piston-type internal combustion engine. Instead, it is naturally also possible to use a rotary piston engine or an electric motor or a jet drive or a turboprop drive.

In general, the air screw 36 can accordingly be replaced with a turbine.

An important feature of the flight unit 25 is its lightweight construction, as can be seen from FIGS. 2A, 2B and 2C.

It has a front coupling apparatus 26, which comprises two parallel coupling horns 27, which are disposed parallel and with mutual spacing from one another, as shown in FIG. 2B. These coupling horns 27 form coupling faces 18 on the underside of the cockpit 2 and are coupled there solidly to the cockpit, because the cockpit is thus engaged from below.

Further coupling faces 19 also embodied on the rear end of the cockpit 2, so that the other parts of the coupling apparatus 26 can also be coupled to the rear end of the cockpit 2. The coupling mechanism will be addressed in further detail in conjunction with FIG. 3A.

In FIGS. 2A, 2B and 2C, it can also be seen that the wings 30 are attached laterally to the aircraft struts 38, so that the motor part 34 is mounted in a raised position on the aircraft strut 38.

There is one support wheel 37 on the underside of each of the aircraft struts 38, and the aircraft struts 38 extend rearward, where they form the tail assembly 39 together with the horizontal stabilizer 40 and the rudder units 41.

In addition, besides the coupling horns 27 extending parallel to one another, the coupling apparatus 26 has a lower coupling pan 31, as described in FIG. 2B, which serves to join the two coupling horns 27 to one another in order to achieve a stable connection with the road vehicle 1.

It is important that the throttle 29 and the control stick 28 are disposed on the top side of the coupling apparatus 26, and that upon coupling, these control elements protrude into the passenger compartment and as shown in FIG. 2B can be actuated by the driver using his left and right hands.

In FIGS. 3A, 3B, 3C, one such coupling procedure will now be described in further detail. It can be seen from FIG. 3A that the two parts 1, 24 are guided toward one another in the directions of the arrows 22, in order to move the coupling apparatus 26 to underneath the cockpit 2, as shown in FIG. 3B. During the coupling procedure, the road vehicle 1 is preferably braced on the street by a stand 23, to prevent it from falling over.

In FIG. 3B, the coupling apparatus 26 is thus moved underneath the cockpit 2 of the road vehicle 1, and it is then pivoted upward in the direction of the arrow 24, to put the coupling faces associated with one another into engagement.

The coupling at the rear is accomplished preferably via two opposed couplings 43; one coupling part is disposed on the road vehicle, and the other coupling part is disposed on the motor part 34.

Once the coupling of the two parts has been accomplished, in accordance with FIG. 3C, a finished lightweight aircraft 45 is thus created, which can fly excellently.

It remains an option whether, for starting, the drive of the rear wheel 9 of the road vehicle 1 is used, or whether the drive is put out of operation. It can also be provided that the entire tail rocker with the rear wheel 9 be folded upward in operation as a lightweight aircraft, so as to disengage the rear wheel from the ground.

In the exemplary embodiment shown, only the main landing gear 32 with the wheel 33 then take on the bracing with respect to the ground; of the road vehicle, only the front wheel 8 is used to transmit loads.

It is equally possible to design the main landing gear 32 and the wheels 33 so that they can be pivoted upward and lowered, as is known per se for airplanes.

The coupling of a road vehicle with a front wheel 8 lowered onto the ground and with the rear wheel 9 and with a raisable and lowerable main landing gear 32 has the further advantage that if the lifting drive of the main landing gear 32 fails, the lightweight aircraft 45 can still be safely landed, since the front wheel 8 and the rear wheel 9 take on the corresponding task of bracing relative to the runway.

The advantage of the flight unit 25 is that it can be stored and kept separately from the road vehicle, with a tarp 44 covering the vulnerable part of the flight unit as shown in FIG. 4.

In conjunction with FIG. 3B, it will also be noted that the coupling apparatus 26 is pivoted into the cockpit 2 through a bottom opening 42 in the cockpit. This is indicated in the direction of the arrow 24 in FIG. 3B.

As shown in FIG. 5, as an alternative to the lightweight aircraft 45, still other flight units can be created. FIG. 5 here shows a rotor blade 46, which comprises a nondriven rotor blade 47 and which in a manner known per se has a tail assembly 39. The rotary drive of the rotor blade 47 is effected solely by the propulsion of the entire rotor blade 46.

As an alternative embodiment, the flight unit can also be embodied as a helicopter, with a rotor 48 driven via a drive motor 35 and with an also-driven tail rotor 49.

In all the embodiments, it is important that an especially lightweight aircraft is created, which can be operated with easily obtained pilot's licenses without requiring a major flight test, and therefore such flight units can be used for many people. Such lightweight flight units can therefore be used not only for military and private purposes, but also for police work, for monitoring tasks, and for all other tasks for which lightweight aircraft are intrinsically suitable.

Here in the invention, however, the advantage is that the separation between the road vehicle 1 and the flight unit 25 means that a road vehicle 1 can be coupled with any arbitrary other flight unit, which was previously unknown. This kind of combined road vehicle with a flight unit is also well suited for Moon missions, because the flight unit can be landed at a suitable location and uncoupled there, and then the mission site can be reached by driving the road vehicle.

After the mission is complete, the road vehicle is driven back to the parked flight unit, coupled to it there, and can be started again.

For this reason, the easily maneuverable road vehicle can be brought to very tightly defined mission regions, such as tunnels and the like, which cannot be reached at all with a conventional flight unit. In that case (use in a tunnel), the flight unit is landed outside the tunnel; the road vehicle and the flight unit are then uncoupled, and the road vehicle can be moved into the tightly defined mission space and driven back out again, which with conventional lightweight aircraft was impossible until now.

LIST OF REFERENCE NUMERALS

1 Road vehicle (with single-file seating)
2 Cockpit
3 Windshield
4 Driver
5 Passenger
6 Door with cladding
7 Landing gear
8 Front wheel (steerable)
9 Rear wheel
10 Rocker
11 Shock absorber
12 Motor
13 Closure flap
14 Opening
15 Leg
16 Rail
17 Directions of arrows
18 Coupling face
18 Coupling face
20 Taillight
21 Headlight
22 Direction of arrow
23 Stand
24 Direction of arrow
25 Flight unit
26 Coupling apparatus
27 Coupling horn (double)
28 Control stick
29 Throttle
30 Wing
31 Coupling pan
32 Main landing gear
33 Wheel
34 Motor part
35 Flight drive mechanism
36 Airscrew
37 Support wheel (double)
38 Aircraft spar
39 Tail assembly
40 Horizontal stabilizer
41 Rudder unit
42 Opening
43 Coupling
44 Tarp
45 Lightweight aircraft
46 Gyroplane
47 Rotor blade
48 Rotor
49 Tail rotor
50 Helicopter

The invention claimed is:

1. A vehicle, suitable as both a road vehicle and an aircraft, comprising two units that can be coupled to one another, in which a first unit is embodied as a road vehicle (1) with at least single-file seating having only two wheels arranged along a single longitudinal axis of the road vehicle, and a second unit is embodied as a flight unit (25),
wherein road vehicle (1) has a cockpit (2), the cockpit having sides which encloses and surrounds the road vehicle (1), and a floor,
wherein the cockpit (2) has a first opening (14) in the floor, a closure flap (13) is disposed so as to be displaceable in the longitudinal direction of the road vehicle (1) to selectively open and close the opening, and
wherein in response to the road vehicle dropping below a certain moving speed, the closure flap (13) is movable abruptly under spring load into an open position to permit stabilization of the road vehicle while in a stopped position.

2. The vehicle as defined by claim 1, wherein the road vehicle (1) is assigned its own drive motor (12), and the flight unit (25) is also assigned its own drive motor (35).

3. The vehicle as defined by claim 1, wherein the cockpit (2) has at least one opening (6) for boarding and disembarking, or is to be opened in its entirety.

4. The vehicle as defined by claim 1, wherein the flight unit (25) comprises at least the following parts: a load-bearing surface (30) or rotor, a main landing gear (32), a flight drive mechanism (35), and at least one tail assembly (40, 41).

5. The vehicle as defined by claim 1, wherein the flight unit (25) has a coupling apparatus (26) on a front free end and can be coupled to certain parts of the road vehicle (1).

6. The vehicle as defined by claim 1, wherein the flight unit (25) has a front coupling apparatus (26), which comprises two parallel coupling horns (27), and the coupling horns (27) form coupling faces (18) on the underside of the cockpit (2).

7. The vehicle as defined by claim 1, wherein on the back end of the cockpit (2), a coupling face (19) is embodied with two opposed couplings (43), and one coupling part is disposed on the road vehicle (1) and one coupling part is disposed on a motor part (34).

8. The vehicle as defined by claim 5, wherein the coupling apparatus (26) can be pivoted into the cockpit (2) through a second opening (42) in the floor of the cockpit.

9. The vehicle as defined by claim 1, wherein the flight unit (25) has its own flight drive mechanism (35), such as an internal combustion engine, a rotary piston engine, a jet turbine, or a turboprop drive.

10. The vehicle as defined by claim 9, wherein the flight drive mechanism (35) of the coupled flight unit (25) drives either an airscrew (36), a rotor blade (46, 47), or at least one rotor (48, 49).

11. The vehicle as defined by claim 6, wherein a throttle (29) and a control stick (28) are disposed on the upper side of the coupling apparatus (26), and on coupling to the road vehicle (1), these control elements (28, 29) protrude into the passenger compartment (2).

12. The vehicle as defined by claim 1, wherein the flight unit (25) is capable of flight only in combination with the first unit (1).

13. The vehicle as defined by claim 1, further comprising a sensor operatively connected to the closure flap to automatically move the closure flap into the open position as a function of the travel situation of the road vehicle.

14. The vehicle as defined by claim 1, further comprising a mechanical bracing element configured to be selectively raised and lowered through the opening in the cockpit to protect the road vehicle from tipping over.

* * * * *